United States Patent
Haegele

(10) Patent No.: US 6,578,038 B1
(45) Date of Patent: *Jun. 10, 2003

(54) MANAGING DIRECTORY LISTINGS IN A RELATIONAL DATABASE

(75) Inventor: Gerald E. Haegele, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 260 days.

This patent is subject to a terminal disclaimer.

(21) Appl. No.: 09/672,329

(22) Filed: Sep. 29, 2000

(51) Int. Cl.⁷ .............................................. G06F 17/30
(52) U.S. Cl. ....................................................... 707/100
(58) Field of Search ............................... 707/1, 3, 100, 707/104.1

(56) References Cited

U.S. PATENT DOCUMENTS

| | | | | |
|---|---|---|---|---|
| 5,210,868 A | * | 5/1993 | Shimada et al. | 707/104.1 |
| 5,388,196 A | * | 2/1995 | Pajak et al. | 345/751 |
| 5,515,488 A | * | 5/1996 | Hoppe et al. | 345/440 |
| 5,678,045 A | * | 10/1997 | Bettels | 707/200 |
| 5,752,025 A | * | 5/1998 | Shakib et al. | 707/102 |
| 5,752,243 A | * | 5/1998 | Reiter et al. | 707/101 |
| 6,192,373 B1 | * | 2/2001 | Haegele | 707/1 |

* cited by examiner

Primary Examiner—Safet Metjahic
Assistant Examiner—Haythim Alaubaidi
(74) Attorney, Agent, or Firm—Akerman Senterfitt

(57) ABSTRACT

A method for managing hierarchal listings of indented caption sets in a relational database of complete listings can include uniquely identifying each listing by a listing object identifier (LOID). The method also can include uniquely identifying each caption set within the listings and each level of indentation for each caption set by a caption set object identifier (CSOID). Individual words for each listing can be parsed and a relational table indexed by the relational database with an entry for each of the parsed words can be created. Each of the entries can include a respective LOID and CSOID for each parsed word. Caption sets can be searched for in the relational database by searching the parsed words in the relational table. The LOID and the CSOID can be used as index links to the relational database to retrieve data.

15 Claims, 4 Drawing Sheets

```
                                                    10
ABC Department Store-563-2000
(1)    Apparel
(2)       Men's
(3)          Suits-2030
(3)          Casual-2055
(3)          Shoes-2041
(2)       Women's-2031
(3)          Dresses
(3)          Intimate
(3)          Shoes
(2)       Children's-2077
(1)    Auto-2011
(2)       Repair-2033
(2)       Tires-2034
(1)    Computers-2066
(1)    Bed & Bath-2003
(1)    Furniture-2003
(1)    Housewares & Appliances-2066
(1)    Information
(2)       General-2000
(2)       Accounts-2001
(1)    Sporting Goods-2082
```

```
                                                        10
ABC Department Store-563-2000
(1)     Apparel
(2)         Men's
(3)             Suits-2030
(3)             Casual-2055
(3)             Shoes-2041
(2)         Women's-2031
(3)             Dresses
(3)             Intimate
(3)             Shoes
(2)         Children's-2077
(1)     Auto-2011
(2)         Repair-2033
(2)         Tires-2034
(1)     Computers-2066
(1)     Bed & Bath-2003
(1)     Furniture-2003
(1)     Housewares & Appliances-2066
(1)     Information
(2)         General-2000
(2)         Accounts-2001
(1)     Sporting Goods-2082
```

FIG. 1

| CSOID | IOID | LOID | WORD |
|---:|---:|---:|---:|
| 001 | 001 | 302011 | ABC |
| 001 | 001 | 302011 | DEPARTMENT |
| 001 | 001 | 302011 | STORE |
| 001001 | 001 | 302011 | APPAREL |
| 001001001 | 001 | 302011 | MEN'S |
| 001001001001 | 001 | 302011 | SUITS |
| 001001001002 | 002 | 302011 | CASUAL |
| 001001002003 | 003 | 302011 | SHOES |
| 001001002 | 002 | 302011 | WOMEN'S |
| 001001002001 | 001 | 302011 | DRESSES |
| 001001002002 | 002 | 302011 | INTIMATE |
| 001001002003 | 003 | 302011 | SHOES |
| 001001003 | 003 | 302011 | CHILDREN'S |
| 001002 | 002 | 302011 | AUTO |
| 001002001 | 001 | 302011 | REPAIR |
| 001002002 | 002 | 302011 | TIRES |
| 001003 | 003 | 302011 | COMPUTERS |
| 001004 | 004 | 302011 | BED |
| 001004 | 004 | 302011 | BATH |
| 001005 | 005 | 302011 | FURNITURE |
| 001006 | 006 | 302011 | HOUSEWARES |
| 001006 | 006 | 302011 | APPLIANCES |
| 001007 | 007 | 302011 | INFORMATION |
| 001007001 | 001 | 302011 | GENERAL |
| 001007002 | 002 | 302011 | ACCOUNTS |
| 001008 | 001 | 302011 | SPORTING |
| 001008 | 001 | 302011 | GOODS |

FIG. 2

```
(1)    Apparel
(2)        Men's Suits-2030
(2)        Men's Casual-2055
(2)        Men's Shoes-2041
(2)        Women's-2031
(3)            Dresses
(3)            Intimate
(3)            Shoes
```

FIG. 3

|                     | 14 |
|---------------------|----|
| (1) Apparel         |    |
| (2)     Shoes       |    |
| (3)         Men's-2041 | |
| (3)         Women's-2031 | |

FIG. 4

MANAGING DIRECTORY LISTINGS IN A RELATIONAL DATABASE

CROSS REFERENCE TO RELATED APPLICATIONS

This Application claims the priority of U.S. patent application Ser. No. 09/079,698 filed May 15, 1998.

BACKGROUND OF THE INVENTION

1. Technical Field of the Invention

This invention relates generally to the field of managing directory listing caption sets, and in particular, to navigation, storage and retrieval filtering of telephone listing caption sets in a relational database.

2. Description of Related Art

Telephone directory listings may contain several "caption sets" per listing. "Caption sets" are also referred to as "indents". Each caption set may contain several children and further children of children in a hierarchal manner. A large listing such as a university, a department store or a hospital, for example, may contain several hundred indents nested at several different levels. Although a relational database, such as DB2, has bill-of-material queries for "parts-of-parts" queries, it is too slow for typical directory assistance queries, does not provide for advanced matching rules or filters needed for caption sets, and does not provide for built-in navigation of the hierarchy without executing subsequent time consuming searches.

Although a department store listing may have both a "men's" department and a "shoe" department, the query may need to match against a caption set indent that is a "men's shoe" department, determine it's parent and children indents if any, and correctly display the appropriate caption set indents in the appropriate order and indentation levels in a fast and efficient manner. The problem is further compounded when listing data needs to be joined from several tables because of one-to-many and many-to-many relationships, which are typical situations. Telephone directory listings are constantly updated on both a listing and an indent level and the indexing schemes and data design schemes must accommodate these changes.

SUMMARY OF THE INVENTION

The inventive arrangements taught herein define a method for indexing and storing hierarchical caption sets (indents) within a relational database, for example a database of telephone directory listings, efficiently applying matching rules, identifying nested parent-child hierarchies, and properly sorting and displaying listings and their indents according to the appropriate levels of indents found by the matching rules for a specific query.

In accordance with the inventive arrangements, a pre-index table for the database is created. The varying levels of indentation, or caption sets, and the listings are assigned unique identifiers. The table is populated with parsed words from the listings, together with the unique identifiers. Queries are undertaken in the pre-index table, wherein the indentation data makes it possible to identify the correct caption set or sets irrespective of the order of indentation in different listings for the same words or products. The unique identifiers are then used as numeric keys to index the table to the entire relational database, and thus retrieve data which is stored exclusively in the relational database on the basis of a much faster and more efficient query through the table. The retrieved data can include, for example, telephone numbers, address, hours of operation, credit cards accepted and other kinds of relevant data.

A method for managing hierarchal listings of indented caption sets in a relational database of complete listings, in accordance with an inventive arrangement, comprises the steps of: uniquely identifying the listing by a listing object identifier (LOID); uniquely identifying each caption set within the listings and each level of indentation for each caption set by a caption set object identifier (CSOID); parsing individual words of each listing; creating a relational table indexed by the relational database with an entry for each of the parsed words, each of the entries including a respective LOID and CSOID for each parsed word; searching for caption sets in the relational database by searching the parsed words in the relational table; and, using the LOID and the CSOID as index links to the relational database.

The method can further comprise the step of retrieving data stored exclusively in the relational database according to the LOID and the CSOID index links, whereby the data stored exclusively in the relational database can be retrieved more efficiently by indirect queries directed to the relational table than direct queries to the relational database. The method can still further comprise the steps of: redundantly identifying the level of indentation for each caption set by an independent indentation object identifier (IOID); including a respective IOID in each entry; and, using the IOID as a further index link to the relational database. The listings can be telephone directory listings and the data stored exclusively in the relational database can comprise telephone numbers. The method can further comprise the step displaying in full, with proper indentation, any desired portion of any of the listings from the retrieved data.

A method for retrieving data from hierarchal telephone directory listings represented as persistent objects in a complete relational database, caption sets of identical words having different hierarchal relationships in different ones of the listings, in accordance with another inventive arrangement, comprises the steps of: representing each listing, parsed words in each listing, the caption set and each indentation of each caption set as persistent objects in a pre-index table; linking the table to the relational database with at least one unique key; searching for telephone numbers in the database by searching the caption sets in the table; and, retrieving telephone numbers from the database, based upon the at least one unique key returned by the searching in the table.

The method can further comprise the step of linking the table to the relational database with a listing object identifier (LOID) uniquely identifying each listing and a caption set object identifier (CSOID) uniquely identifying each caption set within each listing and each level of indentation for each caption set. The LOIDs and the CSOIDs can be used for navigating within the caption sets of the table.

The method can further comprise the step of further linking the table to the relational database with an indentation object identifier (IOID) redundantly identifying the level of indentation for each caption set. The IOIDs can also be used for navigating within the caption sets of the table.

A method for managing hierarchal listings of caption sets, in accordance with yet another inventive arrangement, comprises the steps of: representing each caption set of each listing as a persistent object in a relational database based on a unique identification; uniquely identifying all indentations of each caption set of each listing by a caption set object identification (CSOID); and, representing each list as a persistent object in a relational database based on the CSOID.

The method can further comprise the step of navigating within the caption sets using the CSOIDs. The navigating step can comprise traversing all parent-child relationships of the caption sets hierarchally, including nested indents.

BRIEF DESCRIPTION OF THE DRAWINGS

FIG. 1 is an example of a telephone directory listing for the "ABC Department Store".

FIG. 2 shows a pre-index table showing three unique identifiers for each parsed word in the telephone directory listing shown in FIG. 1.

FIGS. 3 and 4 are examples, in part, of alternative telephone directory listings to that shown in FIG. 1.

DETAILED DESCRIPTION OF THE PREFERRED EMBODIMENTS

The inventive arrangements are particularly useful for managing, that is, navigating, storing and retrieval filtering of directory listing caption sets in a relational database, for example listings of telephone numbers.

Each listing, which may contain hundreds of indents at varying levels of indentation, is uniquely identified by a "Listing Object Identifier" (LOID), which is a numeric key. In the DB2 program, for example, these are integer data types. Each indent within a listing, which may be both a parent and a child, is uniquely identified by a "Caption Set Object Identifier" (CSOID), which is a varying length character string that consists of at least three bytes, but may be up to 249 bytes, for example, to accommodate 83 levels of indents (3*83). This number is arbitrary, but does represent a number believed to be at least large enough to accommodate any present directory of listings. Each unique level of indentation, which is the "Indentation Object Identifier" (IOID), is represented by a three byte string within the CSOID and is always an offset of n*3 from the first byte in the CSOID. Therefore, to uniquely identify one indent within a listing, for example the "Men's Shoe" department within a department store listing, a combination of the LOID, CSOID, and IOID are used. The IOID is not strictly necessary, as the information therein is redundant to three bytes in the CSOID for each entry, but as a practical matter, the additional work required to enter the IOID is more than offset by the increased efficiency in processing queries.

The presently preferred embodiment is based on three byte sets of data, that is 001, as described above. This permits up to 999 elements at the same hierarchal or indent level, that is 001–999. The arrangement can be expanded to use larger sets of data. Four byte sets of data, for example, permit 9999 elements at the same hierarchal or indent level, that is 0001–9999.

A sample directory listing 10 is shown in FIG. 1, for a part of the telephone number directory for the "ABC Department Store". A pre-index table of the listing 10, in accordance with the inventive arrangements, is shown in FIG. 2. The individual words of the listing 10 of each indent are parsed, also referred to as tokenized. The pre-index, which will be keyed to a relational database of the complete telephone directory listings, including the telephone numbers, is constructed so that each row consists of a parsed word, a corresponding CSOID, a corresponding IOID and a corresponding LOID.

The pattern of the CSOID, IOID and LOID can be ascertained from the following examples. The minimum length of a CSOID is three bytes, as in the entries of ABC. DEPARTMENT and STORE in the table in FIG. 2. The identical LOID for each of these entries, namely 302011, together with the three byte CSOID at a value of 001 indicates a title of a listing. Each entry for a listing has the same LOID, as in this example. The Apparel entry has a CSOID of six bytes. At three bytes per indentation, it can be determined upon search that Apparel is one indent within the broader ABC Department Store listing, because the CSOID of apparel is three bytes longer than the CSOIDs of ABC, Department and Store. The CSOID for the Men's entry is nine bytes, and its right-most three bytes, which are identical to its IOID, are 001. It can be determined upon search that Men's is one indent within Apparel, and that Men's is the indented item within Apparel. The CSOID for Suits is twelve bytes, and its right-most bytes are 001. It can be determined upon search that Suits is one indent within Mens's and the first indented item within Men's. The CSOID for Casual is twelve bytes, and its right-most bytes are 002. It can be determined upon search that Casual is one indent within Mens's and the second indented item within Men's. Skipping several entries, as the pattern emerges, the CSOID for Auto is six bytes, and its right-most bytes are 002. It can be determined upon search that Auto is one indent within ABC Department Store and the second indented item within ABC Department Store.

The pattern can also be characterized as building sequences. Each CSOID is represented in part by a CSOID of a previous entry. For example, the CSOID of Apparel is the left-most six bytes of the CSOID of Men's. The three right-most bytes are 001, indicating the first indent under the previous indent. The CSOID of Men's is the left-most nine bytes of the CSOID of Suits. The three right-most bytes are 001, indicating the first indent under the previous indent. The CSOID of Men's is also the left-most nine bytes of the CSOID of Casual. The three right-most bytes are 002, indicating a second indent at the same level as the previous entry. The CSOID of Men's is also the left-most nine bytes of the CSOID of Shoes. The three right-most bytes are 003, indicating a third indent at the same level as the previous indent. Skipping down, the CSOID of the basic listing, that is 001, is the left-most three bytes of Information. The three right-most bytes are 007, indicating a seventh indent of the listing itself. The CSOID of Information is the left-most six bytes of Accounts. The three right-most bytes are 001, indicating a first indent within General, the previous entry.

Using the pre-index table allows for a very fast standard query language (SQL) query to locate all indents within the same query within the same indent level or within the same parent child relationship. It is faster to query the table than to query the complete database, insofar as it is necessary to analyze the potential hierarchal alternatives of the words of the caption sets. The problem can be ascertained by a comparison of a portion of the listing 10 in FIG. 1 with the partial listings 12 and 14 in FIGS. 3 and 4 respectively.

Assume that a male customer wants to purchase shoes for himself at the ABC Department Store, and requests the telephone number of the proper department from general directory assistance. An operator must then locate the correct extension from a large database of thousands of listings, including many department stores and other business or universities having extended listings.

In listing 10, Apparel is a single indent or indentation of the ABC Department Store, and thus noted by a (1). Mens's is a further indent or indentation under Apparel, thus being a double indent or indentation. Double indentations are noted by (2). Shoes is a further indent or indentation under Men's, thus being a triple indent or indentation. Triple indentations are noted by (3). In terms of indents, the hierarchal relationship in FIG. 1 between Apparel, Men's and Shoes is (1)/(2)/(3).

An alternative arrangement is shown in partial directory 12 in FIG. 3. This alternative arrangement is, for all practical purposes, just as likely to be used by a business as the arrangement in FIG. 1. In FIG. 3, Apparel is also a single indent noted by (1), but both Men's and Shoes are on the same line, and so each is one indent under Apparel. The indentation level for each is noted by (2). In terms of indents, the hierarchal relationship in FIG. 3 between Apparel, Men's and Shoes is (1)/(2)/(2).

Another alternative arrangement is shown in partial directory 14 in FIG. 4. This alternative arrangement is, for all practical purposes, just as likely to be used by a business as the arrangements in FIGS. 1 and 3. In FIG. 4, Apparel is also a single indent noted by (1), but Shoes is the next indent under Apparel, noted as a (2) and Men's is an indent under Shoes, noted as a (3). Not only is the indentation different, but the order of Men's and Shoes is reversed, as compared to listings 10 and 12. In terms of indents, the hierarchal relationship in FIG. 4 between Apparel, Men's and Shoes is (1)/(3)/(2).

It is clear that any search engine must be able to identify any one of the listing arrangements shown in FIGS. 1, 3 and 4, as well as others not shown, in order to retrieve the proper telephone number or other data. This is advantageously accomplished in accordance with the inventive arrangements by creation of the pre-index table shown in FIG. 2, wherein the unique identifiers described above, namely the CSOID, the LOID, and optionally and preferably, the IOID, are entered for each parsed word of the listing. The query is then undertaken in the pre-index table, wherein the indentation data in the CSOID makes it possible to identify the correct caption set or sets irrespective of the order of indentation in different listings for the same words or products. The CSOID and the LOID, and optionally and preferably the IOID, are then used a numeric keys to index the table to the entire relational database, and thus retrieve data which is stored exclusively in the relational database on the basis of a much faster and more efficient query through the table. In this example, the kind of data which is stored exclusively in the relational database and not in the table will at least be telephone numbers. Other data can also be stored exclusively in the relational database, for example, and without limitation, address, hours of operation, credit cards accepted and other kinds of relevant data. Depending upon the nature of the data and the searching requirements, such additional data can also be parsed and included in the pre-index table.

Each time the relational database is updated or revised, the pre-index table can be easily updated and revised accordingly. Each change of indentation of a previously parsed word will result in a new CSOID, and optionally and preferably a new IOID. Each new word will be parsed and a new CSOID, LOID, and optionally and preferably IOID, will be generated. The corresponding entry for each word deleted from the database is deleted from the table.

Two examples illustrate this methodology. In example one, a user wants to find all listings that match the phrase "Mens' Shoes". The SQL query can easily and efficiently locate all rows with "Men's" and "Shoes" and additionally match on the LOID and IOID to determine if these words exist in the same indent in the same listing. These rows actually exist in the pre-index, which is really a relational table that is indexed by the relational database. The results of this table query are joined to another table with complete listing data, that is the database, based on the LOID and optionally the IOID used as keys to join both tables. In example two, a user wants to find all listings that match the situation where the words "Men's" and "Shoes" either appear in the same indent, or are children of the same parent of the same listing. Once again a similar SQL query as in example one is employed, but this time the match also examines the CSOID in addition to the LOID and the IOID to determine if these words exist in the same indent or parent-child relationship in the same listing. In the second example, the CSOID provides valuable matching information because it contains the complete hierarchy and navigational tree up to and including that indent in three byte offsets. Therefore the CSOID can determine if the word matches are in either children of the same parent or are a child-parent relationship simply by the length of the CSOID and the three byte lOlDs it contains. The CSOID is also used for sorting a listing correctly by its caption sets and for determining the indentation amount for display of each line.

The foregoing examples show that the method for managing hierarchal listings of caption sets in accordance with the inventive arrangements can be characterized in an alternative manner. A first step is representing each caption set of each listing as a persistent object in a relational database based on a unique identification. All indentations of the caption sets of each listing are then uniquely identified by a CSOID. Finally, each listing is represented as a persistent object in a relational database based on each CSOID. It is then possible to navigate within the caption sets using the CSOIDs. The navigating step can advantageously comprise traversing all parent-child relationships of the caption sets hierarchically, including nested indents.

What is claimed is:

1. A method for managing hierarchal listings of indented caption sets in a relational database of complete listings, comprising the steps of:

uniquely identifying each said listing by a listing object identifier (LOID);

uniquely identifying each said caption set within said listings and each level of indentation for each said caption set by a caption set object identifier (CSOID);

parsing individual words of each said listing;

creating a relational table indexed by said relational database with an entry for each of said parsed words, each of said entries including a respective LOID and CSOID for each said parsed word;

searching for caption sets in said relational database by searching said parsed words in said relational table; and, using said LOID and said CSOID as index links to said relational database.

2. The method of claim 1, further comprising the step of retrieving data stored exclusively in said relational database according to said LOID and said CSOID index links, whereby said data stored exclusively in said relational database can be retrieved more efficiently by indirect queries directed to said relational table than direct queries to said relational database.

3. The method of claim 1, further comprising the steps of:

redundantly identifying each said level of indentation for each said caption set by an independent indentation object identifier (IOID);

including a respective IOID in each said entry; and, using said IOID as a further index link to said relational database.

4. The method of claim 1, wherein said listings are telephone directory listings.

5. The method of claim 2, wherein said listings are telephone directory listings and said data stored exclusively in said relational database comprises at least telephone numbers.

6. The method of claim 2, further comprising the step displaying in full, with proper indentation, any desired portion of any of said listings from said retrieved data.

7. The method of claim 5, further comprising the step displaying in full, with proper indentation, any desired portion of any of said listings from said retrieved data.

8. A method for retrieving data from hierarchal telephone directory listings represented as persistent objects in a complete relational database, caption sets of identical words having different hierarchal relationships in different ones of said listings, comprising the steps of:

representing each said listing, parsed words in each said listing, each said caption set and each indentation of each said caption set as persistent objects in a pre-index table;

linking said table to said relational database with at least one unique key;

searching for telephone numbers in said database by searching said caption sets in said table; and, retrieving telephone numbers from said database, based upon said at least one unique key returned by said searching in said table.

9. The method of claim 8, comprising the step of linking said table to said relational database with a listing object identifier (LOID) uniquely identifying each said listing and a caption set object identifier (CSOID) uniquely identifying each said caption set within each said listing and each level of indentation for each said caption set.

10. The method of claim 9, further comprising the step of navigating within said caption sets of said table using said LOIDs and said CSOIDs.

11. The method of claim 9, further comprising the step of further linking said table to said relational database with an indentation object identifier (IOID) redundantly identifying each said level of indentation for each said caption set.

12. The method of claim 11, further comprising the step of also using said IOIDs for navigating within said caption sets of said table.

13. A method for managing hierarchal listings of caption sets, comprising the steps of:

representing each caption set of each said listing as a persistent object in a relational database based on a unique identification;

uniquely identifying all indentations of each said caption set of each listing by a caption set object identification (CSOID); and, representing each said list as a persistent object in a relational database based on each said CSOID.

14. The method of claim 13, further comprising the step of navigating within said caption sets using said CSOIDs.

15. The method of claim 14, wherein said navigating step comprises traversing all parent-child relationships of said caption sets hierarchally, including nested indents.

* * * * *